July 19, 1966
F. E. LONG ETAL
3,261,140
MICROWAVE STERILIZATION AND VACUUMIZING OF PRODUCTS IN
FLEXIBLE PACKAGES AND APPARATUS THEREFOR
Filed Aug. 30, 1963
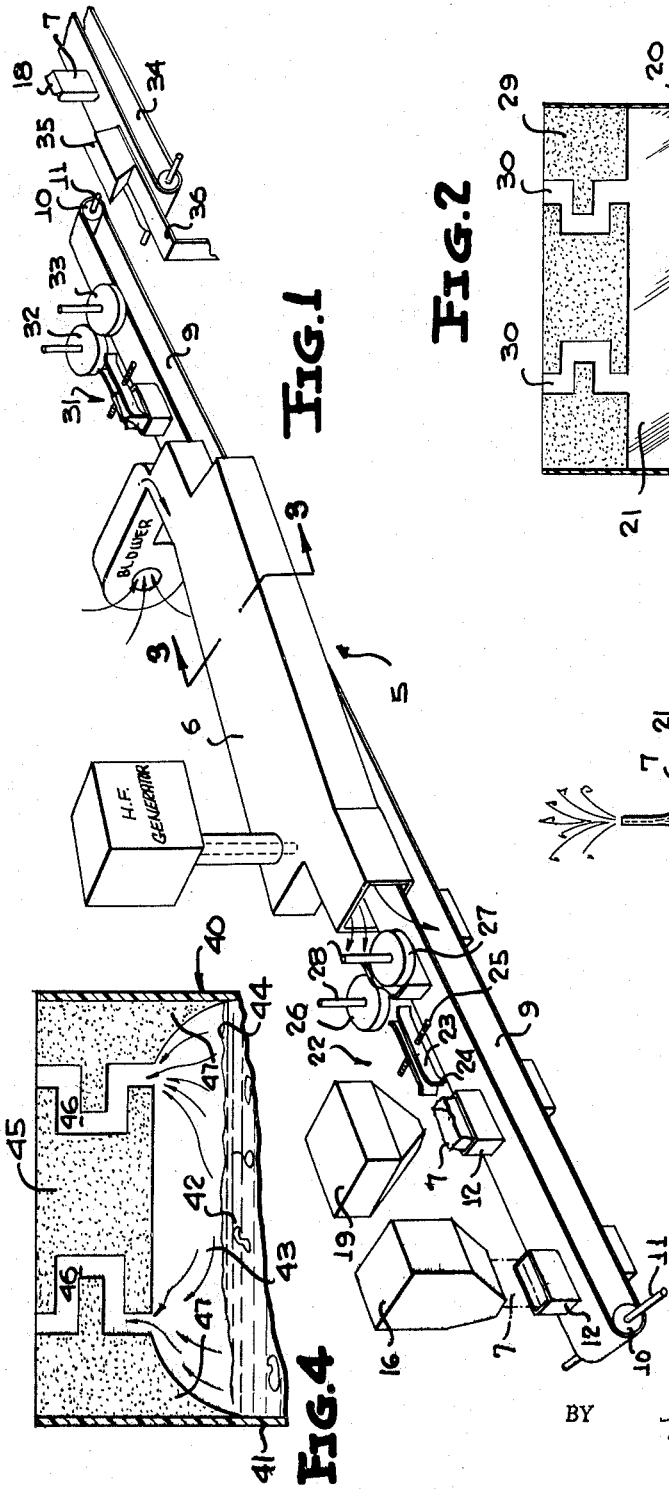
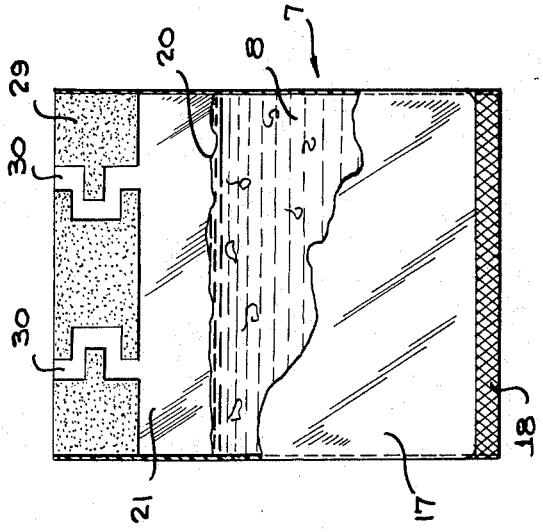
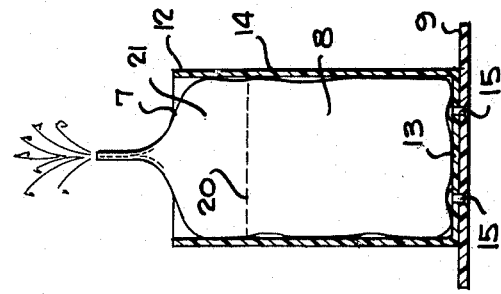
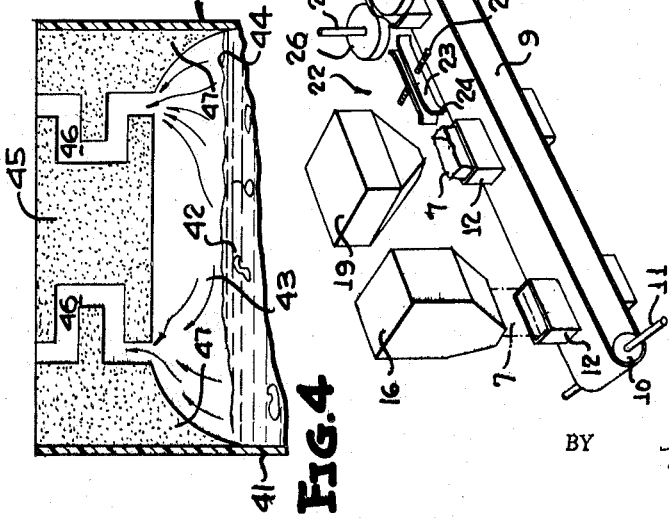
INVENTORS
FLORREN E. LONG,
FRED B. SHAW
& HARVEY C. LISLE
BY
Mason, Porter, Diss & Stewart
ATTORNEYS

United States Patent Office 3,261,140
Patented July 19, 1966

3,261,140
MICROWAVE STERILIZATION AND VACUUMIZING OF PRODUCTS IN FLEXIBLE PACKAGES AND APPARATUS THEREFOR
Florren E. Long, La Grange, Ill., and Fred B. Shaw, Mount Vernon, and Harvey C. Lisle, New Knoxville, Ohio, assignors to Continental Can Company, Inc., New York, N.Y., a corporation of New York
Filed Aug. 30, 1963, Ser. No. 305,750
9 Claims. (Cl. 53—22)

This invention generally deals with the sterilization of materials by means of electromagnetic energy in the microwave range. More specifically, the invention relates to the simultaneous sterilization and vacuumizing of moisture containing food products held within light, flexible plastic pouches by means of electromagnetic energy in the microwave range without distorting or damaging the flexible plastic pouch.

The main advantage that stems from the use of microwave source of energy is that there is no necessity of heating the package which contains the product. Microwave heating systems distribute the heat evenly throughout the product and do not depend upon the conduction of heat through the walls of the pouch from an outside source. Therefore, no conductive continuous phase such as water need be added to the moisture containing food product for later discard by the ultimate user. This aids in maintaining higher vitamin and mineral concentrations in food products and results in greater economy of packaging materials and in lower shipping costs.

Previous methods of sterilizing flexible packaged products have been by conventional heating methods which often damage the heat sensitive flexible material of which the pouch is constructed. Such methods as infra-red, hot liquid immersion and pressure steam retort have been used but are seriously limited due to the necessity of introducing heat to the product to be sterilized through the packaging material. These methods of the prior art were slower, were found to distort or discolor the packaging material, and often caused uneven heating of the packaged product itself so that in many cases portions of the product were damaged or discolored through such overheating. The present invention which utilizes heat from a microwave source, however, obviates the difficulties presented by these former methods.

It is therefore an object of the invention to provide an improved method of sterilizing a packaged product which includes the step of treating a product packaged in a flexible plastic pouch with electromagnetic energy of the microwave range.

It is also an object of the invention to provide a simple and easily accomplished method for simultaneously producing a sterile and vacuum packaged product.

Another object of the invention is the provision of an improved method of producing a sterile vacuum packed product contained within a polymeric film pouch which includes the step of treating the product while contained within the pouch with electromagnetic energy in the microwave range.

Still another object of the invention is to provide an improved method of sterilizing a product contained within a flexible, plastic pouch by means of microwave energy so as to prevent distortion or other damage to the pouch.

A further object of the invention is the provision of an apparatus by which a product packaged in a flexible plastic pouch may be sterilized without distorting or otherwise damaging either the flexible pouch or the product packaged therein.

A still further object of the invention is the provision of an apparatus by which a product contained within a flexible plastic pouch may be easily simultaneously sterilized and vacuumized without distorting or otherwise damaging either the product or the flexible plastic pouch.

It is also a further object of the invention to produce an improved flexible plastic package of a sterile product under vacuum which may be satisfactorily stored at room temperature for indefinite periods of time.

With the above and other objects in view, as will hereinafter appear, the nature of the invention will be more clearly understood by reference to the following detailed description and the accompanying drawings.

In the drawings:
FIGURE 1 is a perspective view of an apparatus suitable for carrying out the present invention.
FIGURE 2 is a front view of a partially sealed flexible plastic film pouch having a product contained therein with parts of the pouch having been broken away and shown in section.
FIGURE 3 is a partial sectional end view taken along the line 3—3 of FIGURE 1, and shows in particular the construction of the plastic pouch holder and the manner in which it operates so as to prevent distortion of the pouch during steam emanation.
FIGURE 4 is a fragmentary vertical sectional view of another flexible plastic film pouch having a product contained therein.

The product materials which have utility in the present invention include chemicals, pharmaceuticals and food materials having relatively high dielectric constants. The product to be sterilized and vacuum packaged may be in either liquid or solid form. The invention has particular utility concerning high acid foodstuffs such as fruits, and vegetables, and includes such specific items as strawberries, raspberries, apples, tomatoes and pickled beets. The invention is, however, not limited to foodstuffs.

An important feature in carrying out the invention is that the dielectric constant of the product must be high in relationship to the dielectric constant of the pouch forming material. The pouch may be formed of any suitable polymeric material film which has a relatively low dielectric constant and preferably embraces those polymeric materials which are of a relatively symmetrical nature. Specific examples of suitable polymeric films are those of the hydrocarbon and polyester groups, such as polyethylene, both high and low density, polypropylene and polyethylene terephthalate "Mylar."

Due to the fact that as yet there are no commercially available high pressure microwave ovens in existence, the invention will be described in relationship to the normal boiling point of water. It is, however, contemplated that as high pressure microwave ovens become available commercially, they may be utilized in conjunction with the present invention for their attendant advantages of increased temperature and reduction of time and energy.

Referring to the drawing, a suitable system 5, as shown in FIGURE 1, is utilized to carry out the present process. A microwave oven 6, such as disclosed in U.S. Patent No. 2,467,230, is suitably disposed along the system 5 so as to receive flexible pouches 7 partially filled with product 8. The oven 6 is adapted to heat and sterilize the product 8 while only negligibly heating the product containing pouch 7. The microwave oven 6 is preferably arranged to operate in the 1 mm. to 30 cm. wave length range, with corresponding frequencies from 300,000 to 1,000 megacycles.

A conveyor belt 9, mounted on rollers 10, is arranged to transport the filled pouches into and out of the microwave oven 6. The rollers 10 are mounted upon shafts 11, one of which is driven by suitable means (not shown). The belt 9 is preferably constructed of a low dielectric material and may consist of the same material utilized in the construction of the pouches 7. Open top pouch holders 12, each having a base 13 and relatively high side walls 14, are secured along the belt 9 at equally spaced intervals. The holders 12 are also made of low dielectric material and are fastened through the bases 13 thereof to the belt 9 by suitable means, such as plastic rivets 15, also of low dielectric material. The holders 12 are further shaped so as to conform to the outer configuration of the filled plastic pouches 7.

A pouch dispenser 16 is mounted directly above the belt 9 at one end thereof and dispenses a pouch 7 into a holder 12 in timed relationship to the movement of the belt 9. The pouch 7 is preferably formed with a seamless tubular wall 17 which is heat sealed at its bottom 18 prior to its insertion into the holder 12. The exact configuration and construction details of the pouch may, however, be varied. As the belt 9, the holder 12, and the pouch 7 move away from the pouch dispenser 16, the uppermost walls of the pouch extend upwardly beyond the side walls 14 of the holder 12 and are open for receipt of the product 8 within the interior of the pouch 7. A product dispenser 19 is located above the belt 9 and its associated holders 12 and is adapted to dispense the product 8 into the interior of the pouches 7 in timed relationship to the movement of the belt 9. The product 8 must contain moisture and is dispensed into the pouches 7 to a level 20 below the termination of the side walls 14 of the plastic holder 12 so as to provide a head space 21 within the plastic pouch 7 above the level 20 of the product 8 contained therewithin.

A heat sealing station 22 is disposed above the belt and downstream of the product dispenser 19. Included in the heat sealing station 22 are parallel bars 23 which have outwardly flared end portions 24 which operate to gather and align the top portions of wall 17 into parallel and opposed relationship. The parallel bars 23 are each connected to a spring 25 for urging the bars 23 together. The parallel aligned portions of the wall 17 are then fed between opposed heated rollers 26 and 27 which heat seal portions of the tubular wall 17 together. The heated sealing rolls 26 and 27 are mounted for rotation on suitable shafts 28 and their surfaces are so configured so as to heat seal only portions of the wall 17 so as to fashion one or more vents which communicate between the interior of the pouch 7 and atmosphere. Those portions of the wall 17 which are heat sealed are designated 29, while the unsealed portions form the vents 30 which normally are of a tortuous configuration.

The thus partially sealed pouch 7 having the product 8 contained therein is then advanced by the movement of the belt 9 into the microwave oven 6 where the pouch 7 and the product 8 are subjected to the action of the electromagnetic wave impulses in the microwave range. As the belt 9, the holder 12, and the pouch 7 are made up of relatively low dielectric materials and since the product 8 has a dielectric constant which is relatively high in comparison to its surrounding materials, the microwave energy will be primarily dissipated in heating the product 8. The product is thus heated to approximately 100 degrees C. with only slight accompanying heating of the pouch 7, the plastic holder 12 and the belt 9. It is thus apparent, that by using the disclosed method and apparatus, the product 8 can be sterilized without resorting to prior art methods which utilize the pouch walls as a conductive element through which the sterilization heat is applied to the product. Accordingly, the invention as herein practiced is simpler, quicker and is not limited by the disadvantages of the prior art methods and devices such as pouch distortion or product overheating.

The rise in the temperature level is not only useful in the sterilization of the product 8, but further serves to expand the air within head space 21 and to volatize the moisture contained within the product 8 into steam. Normally, the production of large quantities of steam would cause a ballooning of the portions of wall 17 that surround the head space 21 if it were not for the high side walls 14 of the plastic holder 12. The high side walls 14, substantially coextensive for all practical purposes with the height of the pouch as shown in FIGURE 3, thus serve to maintain the pouch 7 in its normal configuration and prevent excessive ballooning during the very rapid steam generation. By preventing ballooning of the tubular plastic wall 17, the plastic holder 12 thus increases the rate at which the steam and air may be evolved through the tortuous vents 30.

The pouch 7 containing the sterilized product 8 is then, immediately following its withdrawal from the microwave oven, entirely sealed across the top portions of the wall 17 so as to close off and seal the vents 30. A heat sealing station 31 similar to station 22 is associated in proper relationship to the belt 9 for this purpose, the essential difference being that the rollers 32 and 33 are instead of being designed to only partially seal the top portions of the wall 17, are adapted to entirely seal portions of the wall 17 including the vents 30.

The cooling of the product 8 after its withdrawal from the microwave oven causes a partial vacuum within the pouch 7 through the condensation of the steam within the head space 21. The pouch 7 and the sterilized and vacuumized product 8 are then transferred to a second conveyor belt 34 for packing, storage and shipment. A pouch or bag guide 35 having an open bottom (unnumbered) is positioned slightly above the conveyor belt 34 by a suitable support member 36. As each pouch 7 is transferred from the holders 12 to the conveyor belt 34 the guide 35 positions each pouch 7 upside down upon the conveyor belt and prevents the pouch from falling over upon its side during the transfer. In this upside down position the heat sealed portion 29 easily collapses and lies flat on the conveyor 34 and the hot product 8 completely fills the head space 21.

The reason for transferring the pouches onto the conveyor belt 34 in an inverted or upside down position is to kill any remaining bacteria that is viable in the pouches, and particularly, to kill any bacteria in the abrupt corner (unnumbered) formed by the heat seal 29 and the wall 17. These abrupt corners form pockets that are difficult to sterilize because they are by-passed by the steam escaping through the tortuous vents 30 prior to complete heat sealing of the pouch at the heat sealing station 31. By thus tipping the pouch upside down the hot product completely fills the head space 21 and kills any bacteria remaining in the pouches.

Particular attention is now directed to FIGURE 4 of the drawing wherein is shown another flexible plastic film pouch 40 which is heat sealed in a manner to present all interior portions thereof to hot sterilizing steam by forming a contoured heat seal devoid of abrupt corners.

The pouch 40 has a seamless tubular wall 41 and a heat sealed bottom (not shown) substantially identical to the bottom 18 of the pouch 7. A moisture containing product 42 is dispensed into the pouch 40 in the manner heretofore described, to form a head space 43 above an upper level 44 of the product 42.

The pouch 40 is sealed by sealing roll (not shown) similar to the sealing rolls 26 and 27 to form a heat seal 45 having unsealed tortuous portions forming vents 46. However, the sealing rolls which form the heat seal 45 are also contoured to form gradually curved, heat sealed corner portions 47 between the wall 41 and the vents 46. These corner portions 47 do not form pockets which may be by-passed as in the pouches 7, but rather, permit hot steam escaping through the vents 46 to sterilize the entire interior of the head space 43. This assures that no interior portion of the pouch 40 is not fully exposed to hot sterilizing steam.

Thus, it is apparent that there has been provided, a simple method and associated apparatus for simultaneously sterilizing and vacuumizing a product which is contained within a flexible plastic pouch capable of being heat sealed.

Specific examples of the hereindescribed invention are as follows:

Example I

Stewed tomatoes were dispensed into small polyethylene pouches. Each pouch contained 8 ounces of the product. The pouches were then partially top-sealed while supported by relatively high walled holders also formed of polyethylene in accordance with the invention. The pouches while supported by the holders were then treated for 2½ to 3 minutes in a 900 watt microwave oven (Westinghouse "home" unit). The pouches were subsequently entirely top-sealed and stored at room temperature for six months. The thus sterilized and vacuum packed product was tested and found to be commercially sterile.

Example II

Stewed tomatoes from the same run as utilized in Example I were packaged and treated in the same manner as in Example I except that two 800 watt microwave generators (Raytheon "industrial" unit) were utilized instead of the one 900 watt generator. The product containing pouches were treated for 1½ to 2½ minutes. The test results in a commercially sterile product.

Example III

Whole ripe raspberries were treated in the manner set forth in Example II. The comparative test also resulted in a commercially sterile product.

It is obvious that the specific examples are not restrictive, and that the invention may be practiced in other ways within the scope of the appended claims.

What is claimed is:

1. An improved method of simultaneously sterilizing and vacuumizing a product comprising, partially filling an open topped pouch of low dielectric constant polymeric material with a moisture containing product so as to provide a head space thereover, said product having a relatively high dielectric constant, sealing portions of the top of said pouch above said head space so as to provide a vent for volatiles therethrough, passing the thus partially packaged product through a zone of electromagnetic energy within the microwave range to thereby quickly heat said product to a temperature of about 100 degrees C. and to quickly product large amounts of steam by vaporization of the moisture present in said product, maintaining the walls of said pouch against expansion so as to prevent excessive ballooning of the pouch walls defining said head space, rapidly venting the pouch of air and steam produced by said rise in temperature, and immediately thereafter entirely sealing the top of said pouch so as to provide a vacuum package of a sterile product.

2. An improved method of simultaneously sterilizing and vacuumizing a high acid moisture containing product comprising, partially filling an open topped plastic pouch with said product so as to provide a head space thereover, sealing portions of the top of said pouch above said head space so as to provide a vent for volatiles therethrough, passing the thus partially packaged product through a zone of electromagnetic energy within the microwave range to thereby quickly heat said product to a temperature of about 100 degrees C. and to quickly produce large amounts of steam by vaporization of the moisture present in said product, maintaining the walls of said pouch against expansion so as to prevent excessive ballooning of the pouch walls defining said head space, rapidly venting the pouch of air and steam produced by said rise in temperature, and immediately thereafter entirely sealing the top of said pouch so as to provide a vacuum package of a sterile product.

3. An improved method of simultaneously sterilizing and vacuumizing a product comprising, partially filling an open topped pouch of low dielectric constant polymeric material with a moisture containing product so as to provide a head space thereover, said product having a relatively high dielectric constant, sealing portions of the top of said pouch above said head space so as to provide a vent for volatiles therethrough, passing the thus partially packaged product through a zone of electromagnetic energy within the microwave range to thereby quickly heat said product to a temperature of about 100 degrees C. and to quickly produce large amounts of steam by vaporization of the moisture present in said product, maintaining the walls of said pouch against expansion so as to prevent excessive ballooning of the pouch walls defining said head space, rapidly venting the pouch of air and steam produced by said rise in temperature, and immediately thereafter entirely sealing the top of said pouch and substantially inverting said pouch to transfer the product into said head space so as to provide a vacuum package of a sterile product.

4. An improved apparatus for simultaneously sterilizing and vacuumizing a product comprising means for continuously moving a moisture containing product through a series of stations, said moving means provided with a plurality of pouch holders each composed of a material having a low dielectric constant, a first station including means for dispensing an open topped plastic pouch into each of said holders, said holders being of a height substantially coextensive to the height of the pouches, a second station including means for partially filling said pouch with said product, a third station including means for partially sealing of the top of said pouch, a microwave oven, and means for completely sealing off the top of said pouch; holders providing a means to confine the walls of the pouch in the area of the head space against expansion to prevent ballooning.

5. An improved apparatus for simultaneously sterilizing and vacuumizing a product comprising means for continuously moving a moisture containing product through a series of stations, said moving means provided with a plurality of pouch holders each composed of a material having a low dielectric constant, a first station including means for dispensing an open topped plastic pouch into said holder, a second station including means for partially filling said pouch with said product, a third station including means for partially sealing of the top of said pouch, a microwave oven, means for completely sealing off the top of said pouch and means for inverting said pouch, said inverting means including guide means for guiding each of the pouches to an inverted position with the sealed top of each pouch lowermost.

6. An improved apparatus for simultaneously sterilizing and vacuumizing a product comprising means for continuously moving a moisture containing product through a series of stations, said moving means being provided with a plurality of pouch holders each composed of a material having a low dielectric constant, each holder being of a height substantially coextensive to the height of the pouches, a first station including a means for dispensing an open topped plastic pouch into each holder, a second station including means for partially filling each pouch with a product, a third station including means for partially sealing the top of each of the pouches, a microwave oven through which said moving means advances the pouches, means beyond the microwave oven for completely sealing off the top of said pouches, and means for inverting each pouch upon the removal thereof from the pouch holders, said inverting means including guide means for guiding each pouch to an inverted position with the sealed top of each pouch lowermost.

7. An improved method of simultaneously sterilizing and vacuumizing a product comprising, partially filling an open topped pouch of low dielectric constant polymeric material with a moisture containing product so as to provide a head space thereover, said product having a relatively high dielectric constant, sealing portions of the top of said pouch above said head space so as to provide a vent for volatiles therethrough, passing the thus partially packaged product through a zone of electromagnetic energy within the microwave range to thereby quickly heat said product to a temperature which produces large amounts of steam by vaporization of the moisture present in the product, rapidly venting the pouch of air and steam produced by the rise in temperature, entirely sealing the top of the pouch so as to provide a vacuum package, substantially inverting the vacuum package and transferring the still heated product into the head space to kill any remaining viable bacteria in the head space.

8. An improved method of simultaneously sterilizing and vacuumizing a product comprising, partially filling an open topped pouch of low dielectric constant polymeric material with a moisture containing product so as to provide a head space thereover, said product having a relatively high dielectric constant, sealing portions of the top of the pouch above said head space so as to provide a vent for volatiles therethrough, heating the product to a temperature sufficient to quickly produce large amounts of steam by vaporization of the moisture present in the product, confining the walls of the pouch in the area of the head space against expansion to prevent excessive ballooning of the pouch walls defining the head space, venting the pouch of air and steam produced by the rise in temperature, and thereafter entirely sealing the top of the pouch so as to provide a vacuum package of a sterile product.

9. The method of simultaneously sterilizing and vacuumizing a product as defined in claim 8, and further including the step of immediately reorienting the pouch after the top thereof has been sealed to transfer the product into the head space so as to kill any remaining viable bacteria in the pouches.

References Cited by the Examiner

UNITED STATES PATENTS

| | | | |
|---|---|---|---|
| 2,467,230 | 4/1949 | Revercomb et al. | 219—10.55 |
| 2,748,005 | 5/1956 | Baier | 99—182 |
| 3,108,881 | 10/1963 | Shaw et al. | 99—171 |
| 3,149,772 | 9/1964 | Olson | 229—62 |

OTHER REFERENCES

Benson: "Home Canning by the One Period Cold-Pack Method," U.S. Dept. of Agr. Farmer's Bulletin 839, June 1917, page 15.

RAYMOND N. JONES, *Primary Examiner.*

A. LOUIS MONACELL, *Examiner.*